United States Patent Office 3,090,691
Patented May 21, 1963

3,090,691
METHOD OF PREPARING CERAMIC-LIKE
ARTICLES
Donald E. Weyer, Midland, Mich., assignor to Dow
Corning Corporation, Midland, Mich., a corporation of
Michigan
No Drawing. Filed Nov. 9, 1960, Ser. No. 68,146
6 Claims. (Cl. 106—39)

This invention relates to a method of preparing articles equivalent in thermal and electrical properties to ceramics without the necessity of excessive firing.

This application is a continuation-in-part of the applicant's copending application Serial No. 839,605, filed September 14, 1959, now abandoned.

Ceramic articles are widely employed in industrial applications particularly in those cases where a combination of dimensional stability, chemical inertness and good electrical insulation are required. Ceramic articles are used in these applications in spite of some mechanical disadvantages such as brittleness and fabrication difficulties because they remain unchanged when operating at temperatures of the range of 300° C. or above for years. For example, a ceramic material gives off no volatiles and does not crack or shrink due to aging or chemical reactions taking place slowly at elevated temperatures. This cannot be said of any other electrical insulating materials even though some materials such as siloxane resins will operate for prolonged periods of time up to 300° C.

In spite of their advantages the use of ceramic articles in many applications has some serious disadvantages. These have to do primarily with the difficulty encountered in fabricating a ceramic part to close dimensional tolerances. It has been found that it is not commercially feasible to form a ceramic article to tolerances of closer than plus or minus 10 mils per inch. Any tolerances closer than this must be obtained by machining the fired ceramic article. Such machining is expensive.

There are two general methods for preparing ceramic articles. In the first method the ceramic powder is bonded with a bonding agent such as water, waxes, organic gums, or organic resins. This is done by mixing the ceramic powder with the bonding material and then molding it into the desired shape either by pressure molding or slip casting. The bonded article is then fired. The second method involves the pressing of a dry powder into the desired shape and thereafter firing the article.

Regardless of which method is employed, excessive and non-uniform shrinkage occurs during the fabrication and firing of the ceramic article. This shrinkage has two causes.

The first is due to the evaporation or decomposition of the bonding agent during the drying or firing step. This shrinkage of course occurs at a relatively low temperature. It is not readily controlled and is generally non-uniform.

The second cause of shrinkage is the volume change which occurs during the firing step. This is brought about because in order to obtain a strong coherent mass from heretofore employed processes for making ceramic articles, one must heat the ceramic material to a temperature sufficient to cause a phase change in the ceramic ingredients in order to obtain consolidation of the article.

This phase change can be due to vitrification or partial melting of some of the ceramic particles. The vitrified portion flows around the unvitrified particles thereby cementing the article into a unitary whole. As a portion of the ceramic vitrifies, the melting causes a substantial decrease in volume thereby causing shrinkage.

The phase change can also be due to sintering in which, under the influence of high temperature, some of the crystals of the ceramic particles grow at the expense of other crystals. This causes the centers of two adjacent crystals to move closer together and eventually results in the elimination of voids within the ceramic article. However, sintering causes a substantial decrease in volume and hence excessive shrinkage of the article. Furthermore, this shrinkage is seldom uniform.

A phase change can also result from actual chemical interaction of two or more ingredients in the ceramic mix. This causes at least the partial disappearance of one ingredient and the formation of a separate phase. An example of such an interaction is the reaction of silica and alumina to form mullite when the article is fired at 1590° C. or above. Such a method is shown in U.S. Patent 2,641,044.

Another disadvantage inherent to the heretofore known methods for making ceramic articles is the lack of "green strength" in the molded but unfired article. This lack of green strength occurs even though an organic resin such as a gum is employed in the initial molding step. No appreciable mechanical strength develops in the molded article until it has been heated to a point where a phase change is induced, thereby giving consolidation and shrinkage of the article.

In addition to the high shrinkage one often encounters non-uniform shrinkage from lot to lot. That is, with one batch of material the shrinkage may amount to 10% while with the next batch of a similar material the shrinkage may amount to 20%. This lack of predictability makes it commercially non-feasible to forecast the dimensions of the fired article to closer than 1%. In some cases where close dimensional tolerances are required, the amount of rejects may run as high as 50%.

Another disadvantage encountered with ceramic articles is the cracking that often occurs during firing. This is particularly true with large articles. This cracking can be avoided by proper annealing but such a process requires additional time.

It is highly desirable to be able to prepare a ceramic-like article while avoiding the fabrication difficulties presently encountered. The term "ceramic-like article" means that the articles of this invention exhibit the desirable properties of ceramic materials, namely, dimensional stability, chemical inertness and good electrical properties. They have not, however, been heated to a temperature sufficient to cause a phase change in the ceramic materials employed herein.

It is the object of the present invention to provide a novel method for preparing molded articles which produce ceramic-like materials by standard organic molding techniques. Another object is to provide a method for preparing ceramic-like articles which can be molded and cured without excessive shrinkage. Another object is to prepare molded ceramic-like articles which can be formed to close tolerances (that is plus or minus 1 mil per inch) without the necessity of grinding after firing. Another object is to reduce the cost of intricate ceramic-like articles. Other objects and advantages will be apparent from the following description.

In accordance with this invention, a ceramic-like article is produced by the method comprising heating a mixture of from .1 to 30% by weight of an organosiloxane having a total of from 1 to 3 inclusive substituents of the group hydrogen, and organic radicals attached to the silicon through silicon-carbon linkages which organic radicals are composed of carbon and hydrogen atoms and in which any remaining atoms are of the group oxygen and nitrogen atoms, there being no more than 18 atoms exclusive of hydrogen per organic radical and from 70 to 99.9% by weight of a volatile-free ceramic material having a softening point above 800° C., at a temperature from above 500° C. to 1550° C.

The method of this invention can be carried out with either molded articles or with base members which are coated with the above mixture. In the case of molded articles it is desirable but not essential to include a curing catalyst for the siloxane to aid in curing of the siloxane resin during molding. This gives a coherent, rigid article which can be handled without warping or breaking and which can be subsequently heated to produce the ceramic-like article.

In those cases in which the materials of this invention are to be used for coating one can apply the mixture of siloxane and ceramic material either in the form of a suspension or dry powder, to a base member and thereafter heat above 500° C. until a ceramic-like coating is obtained.

For the purpose of this invention, any organo siloxane in which the substituent groups are hydrogen atoms or organic radicals attached to the silicon through silicon-carbon bonds which organic radicals are composed of carbon, hydrogen, oxygen or nitrogen atoms, and which contain not more than a total of 18 carbon, oxygen or nitrogen atoms per radical, can be employed in this invention.

Preferably, the siloxane should have an average of at least one of the defined organic groups per silicon. These organic groups can be monovalent or they can be polyvalent, that is, the organic group can be attached to only one silicon atom or it can be attached to two or more silicon atoms. Thus, the organosiloxanes of this invention can have units containing structures such as, for example, ≡SiR'Si≡ or

where R' is a divalent radical and R'' is a trivalent radical.

Specific examples of operative siloxanes are hydrocarbon substituted siloxanes such as dimethylsiloxane, monomethylsiloxane, methylhydrogensiloxane, monophenylsiloxane, phenylmethylsiloxane, monoethylsiloxane, monopropylsiloxane, dipropylsiloxane, monovinylsiloxane, monocyclohexylsiloxane or phenyldihydrogensiloxane; siloxanes containing oxygen substituted substituents such as gamma-hydroxypropylmethylsiloxane, beta-methoxyethylmethylsiloxane, gamma-carboxypropylsiloxane,

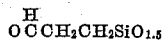

$CH_3OOCCH_2CH_2CH_2SiO_{1.5}$, and

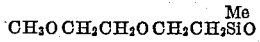

and nitrogen containing substituted siloxanes such as gamma-aminopropylsiloxane, $H_2N(CH_2CH_2NH)_3CH_2CH_2SiO_{1.5}$

gamma-cyanopropylmethylsiloxane and

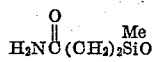

In addition to the above siloxanes in which all of the organic substituents are monovalent, one can employ siloxanes of configurations as follows:

$O_{1.5}SiCH_2CH_2SiO_{1.5}$

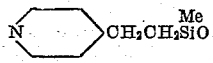

or

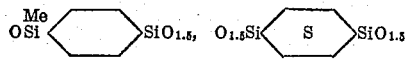

From the above it can be seen that the configuration of the organic substituents on the silicon is immaterial. Thus the substituent groups can be linear, branched, or cyclic in structure.

It should be understood that the siloxanes employed herein can be homopolymers or copolymers or mixtures thereof and the copolymers can be composed of $SiO_2$, monoorgano-, diorgano-, or triorganosiloxane units provided the total average number of organic groups and hydrogen atoms fall within the ratio of from 1 to 3 per silicon atom.

The term "siloxane" as employed herein means that the material contains at least one SiOSi linkage per molecule. Thus the term includes incompletely hydrolyzed silanes.

It should be understood that for the purpose of this invention a siloxane per se can be mixed with the ceramic material or the ceramic material can be mixed with a hydrolyzable organosilicon compound or with a silanol under conditions which will promote the hydrolysis and/or condensation of these materials to produce a siloxane during the mixing or molding steps. The siloxane can also contain SiSi linkages. Thus, for example, one can mix the ceramic material with a methyltrimethoxysiloxane or with dimethylsilazane and allow these materials to hydrolyze to the siloxanes.

A desirable modification of this procedure is to first dissolve a hydrolyzable silane in an aqueous solution and then mix the ceramic material with this solution. It is desirable in such a procedure to include a condensation catalyst such as acetic acid which will promote the hydrolysis and condensation to the corresponding siloxane. When such a mixture is molded or slip cast, the siloxane is generated and condensed in situ thereby bonding the ceramic into a unitary mass which is ready for firing.

Alternatively one may spray the ceramic material with a hydrolyzable silane or with a silazane and allow these materials to hydrolyze on the surface of the ceramic particle prior to molding.

The physical properties of the siloxanes are not critical and they can range from thin fluids to non-flowing gums or solid resins.

Any of the catalysts normally employed for curing organosilicon compounds can be used in this invention. Such catalysts include metal salts of carboxylic acids such as lead stearate, lead 2-ethylhexoate, dibutyltindiacetate, stannous octoate or zinc octoate; quaternary ammonium compounds such as benzyltrimethyl ammonium 2-ethylhexoate, tetramethyl ammonium acetate, or beta-hydroxyethyltrimethyl ammonium hydroxide; organic peroxides such as benzoyl peroxides, tertiary butyl perbenzoate or dicumyl peroxide; chloroplatinic acid or sulfur vulcanizers. When the latter two catalysts are employed, it is necessary that alkenyl radicals and/or hydrogen atoms be attached to the silicon for proper curing.

The ceramic materials employed in this invention can be any ceramic material having a softening point above 800° C. which is volatile-free. The term "volatile-free" means that the ceramic material is free of water, carbonate or other materials which volatilize below 800° C. In general, ceramic materials such as clay, aluminum silicate, magnesium silicate, hydrated alumina, hydrated silica and the like will give up their water of hydration by heating at temperatures at or below 500° C. Those naturally occurring ceramic materials such as asbestos, mica or hydrated clays are not satisfactory for use in this invention. Hydrated clays can be made satisfactory by calcining before use.

For the purpose of this invention the ceramic material can be in the form of either granules or fibers. The particle size of fiber diameter is not critical but can vary depending upon the molding properties desired in the mixture.

The term "ceramic material" as employed herein includes any non-metal inorganic water-insoluble material having a softening or decomposition point above 800° C. This excludes such materials as glass, asbestos and mica. Specific examples of such ceramic materials are aluminum silicate, magnesium silicate, zinc oxide, magnesium oxide, tungsten carbide, titanium carbide, molybdenum carbide, lithium aluminate, silicon nitride, boron nitride, aluminum oxide, silica, zirconia, beryllia, titania, silicon carbide, potassium titanate, zinc silicate, zirconium silicate and titanium silicate and mixed silicates such as calcum aluminum silicate, magnesium aluminum silicate and lithium aluminum silicate. The ceramic material can be derived either from a natural source such as sand, clay or the like or it can be an artificial material such as fume silica.

The relative proportions of organosilicon compound to ceramic material can vary within the above proportions depending upon the flow characteristics desired in the composition. If one wishes to form the article by transfer molding, it is desirable to employ at least 3% by weight siloxane and to employ siloxanes having an average of from 1 to 2 total H and hydrocarbon radicals of less than 7 carbon atoms per silicon. On the other hand, if one wishes to employ straight pressure molding or pressing, as little as .1% by weight organosilicon compound may be employed. If more than 30% by weight organosilicon compound is employed, excessive shrinkage occurs during heating.

It is essential for the production of the materials of this invention that the mixture of organosilicon compound and ceramic material be heated at a temperature above 500° C. The heating is generally carried out until no further weight loss is observed. In general this can be accomplished by heating at 500° to 800° C. or 1550° C. for 2 to 24 hours.

It is applicant's belief that the reason a coherent strong body is obtained by employing his method is that the ceramic particles are cemented together with the silica residue remaining after the organosiloxane has been decomposed by the heat. This cementing action is not dependent upon the interaction of the silica residue with any of the ingredients in the ceramic material. It should be understood, of course, that applicant's invention is not limited to such an explanation of the mechanism by which the particles are bonded together.

If desired, one can employ optional ingredients in the compositions employed herein such as mold release agents such as calcium stearate or pigments such as ferric oxide in order to impart the desired color.

The following examples are illustrative only and should not be construed as limiting the invention which is properly delineated in the appended claims. The following abbreviations are used below: Me for methyl and Ph for phenyl.

EXAMPLE 1

The resin employed in this example was a phenylmethylsiloxane resin having an average of 1.15 total methyl and phenyl radicals per silicon and having a phenyl to methyl ratio of 1.13/1.0. This resin was mixed with the fillers shown in the table below in the amounts specified therein. In each case the composition also contained 1% by weight calcium stearate as a mold release agent and .28% by weight PbO as a catalyst. Each mixture was molded under a pressure of from 1000 to 2000 p.s.i. at 175° C. for 15 minutes. Each sample was then heated 2 hours at 250° C. and then 24 hours at 550° C. The physical properties of each of the molded articles was determined at room temperature after heating 2 hours at 250° C. and 24 hours at 550° C.

Table

| Formulation | | Flexural strength in p.s.i. | | Impact strength in ft. lbs. | | Compressive strength in p.s.i. | |
| --- | --- | --- | --- | --- | --- | --- | --- |
| Percent by wt. resin | Percent by wt. filler | 250° C. | 550° C. | 250° C. | 550° C. | 250° C. | 550° C. |
| 17 | 82% magnesium silicate | 6,300 | 1,690 | 0.86 | 0.36 | 14,000 | 6,500 |
| 17 | 82% alumina | 6,900 | 976 | 0.32 | 0.32 | 13,700 | 7,000 |
| 17 | 38% magnesium oxide / 38% sand / 6% magnesium silicate | 5,020 | 805 | 0.34 | | 12,800 | 7,100 |
| 20 | 37% quartz / 37% sand / 5% magnesium silicate | 7,500 | 1,170 | | | 15,200 | 7,600 |
| 17 | 50% aluminum silicate / 26% sand / 6% magnesium silicate | 5,310 | 2,060 | 0.36 | | 11,350 | 6,200 |

EXAMPLE 2

A mixture of 17% by weight of the resin of Example 1, 82% calcined magnesium silicate, 1% by weight calcium stearate and .28% PbO was molded into bars by heating 15 minutes at 175° C. under a pressure of 2000 p.s.i. Several of the bars were then placed in an oven and heated at 260° C. for 2 hours. Some of the bars were removed and the flexural strength was checked. The remaining bars were further heated at 555° C. for 48 hours. Some of these were then removed and the flexural strength determined. The remaining bars were then further heated 16 hours at 985° C. and the flexural strength and total shrinkage of these bars was determined. The results are shown in the table below.

Table

| Temperature, ° C. | Time heating in hrs. | Flexural strength in p.s.i. | Percent shrinkage |
| --- | --- | --- | --- |
| 260 | 2 | 6,360 | |
| 555 | 48 | 1,690 | |
| 985 | 16 | 1,080 | 8.8 |

EXAMPLE 3

17% by weight of methylhydrogensiloxane was mixed with 82% by weight calcined magnesium silicate, 1% by weight calcium stearate release agent and 1% by weight lead stearate catalyst. The mixture was molded into a bar by heating 30 minutes at 800 p.s.i. at 175° C. The bar was then removed from the mold and heated 24 hours at 537° C. The resulting bar was strong, coherent and possessed ceramic properties.

EXAMPLE 4

A mixture of 13% by weight methylhydrogensiloxane,

4% by weight of a hydroxyl endblocked dimethylpolysiloxane of 50 cs. viscosity, 81% by weight calcined magnesium silicate, 1% calcium stearate and 1% lead stearate was molded into a bar by heating 3 minutes at 175° C. under a pressure of 800 p.s.i. The bar was removed from the mold and then heated 24 hours at 537° C. The resulting bar was strong and coherent and exhibited ceramic properties.

EXAMPLE 5

A mixture of 17% by weight of a copolymer of monomethyl-, dimethyl- and trimethylsiloxane having an average of from 1.26 methyl groups per silicon, 82% by weight calcined magnesium silicate, 1% calcium stearate and 1% lead stearate was molded 30 minutes at 175° C. under a pressure of 800 p.s.i. The resulting article was heated 24 hours at 537° C. to give a strong, ceramic-like article.

EXAMPLE 6

Equivalent results are obtained when the following siloxanes are substituted in the procedure of Example 1:

(1) A copolymer of 10 mol percent monocyclohexylsiloxane, 50 mol percent monomethylsiloxane, 20 mol percent monopropylsiloxane, 10 mol percent $SiO_2$ and 5 mol percent diphenylsiloxane and 5 mol percent $H_2SiO$.
(2) A dimethylpolysiloxane gum.[1]
(3) A copolymer of 50 mol percent monophenylsiloxane and 50 mol percent monoethylsiloxane.
(4) A copolymer of 50 mol percent phenylvinylsiloxane and 50 mol percent phenylmethylsiloxane.[1]

EXAMPLE 7

Strong, coherent articles are obtained when the following ceramic materials are employed in the procedure of Example 1 in the ratio of 10 parts by weight siloxane resin per 90 parts by weight ceramic material:

Lithium aluminum silicate
Silicon carbide
Zinc oxide
Lithium aluminate
Zirconium silicate
Silicon nitride
Tungsten carbide

EXAMPLE 8

.25 g. of $H_2NCH_2CH_2NH(CH_2)_3Si(OMe)_3$ was dissolved in 5 ml. of water and the resulting solution was mixed with 50 g. of ball-milled alumina. This gave a damp powder which was cold pressed into a bar under a pressure of 10 tons gauge. The water was removed by heating to 120° C. The dried product contained .34% by weight $H_2NCH_2CH_2NH(CH_2)_3SiO_{1.5}$ and 99.66% by weight alumina.

The pressed bar was fired by heating to 200° C. and then the temperature was increased at a rate of 100° C. per hour to a temperature of 800° C. The bar was then heated at 1100° C. for 8 hours. The product had a flexural strength of 1662 p.s.i. and a compressive strength of 2286 p.s.i.

This experiment was repeated except that the amount of silane employed was sufficient to give in the molded bar 1.36% by weight $H_2NCH_2CH_2NH(CH_2)_3SiO_{1.5}$ and 98.64% aluminum oxide.

After the bar was fired on the above schedule, the bar had a flexural strength of 3767 p.s.i. and a compressive strength of 5435 p.s.i.

EXAMPLE 9

8 g. of methyltrimethoxysilane was dissolved in 12 g. of water containing two drops of acetic acid. The solu-

[1] Cured with 3 parts benzoyl peroxide per 100 parts siloxane.

tion was mixed with 200 g. of ball-milled aluminum oxide. The mixture was then press molded under 10 tons gauge pressure and the resulting bar was dried at 120° C. This bar was composed of 1.93% by weight $CH_3SiO_{1.5}$ and 98.17% by weight aluminum oxide. The bar was fired in accordance with the schedule of Example 8, and the resulting bar had a flexural strength of 4313 p.s.i. and a compressive strength of 9157 p.s.i.

EXAMPLE 10

The various amounts of various organosilicon compounds shown in the table below were dissolved in 10 ml. of water containing sufficient acetic acid to cause solution. Each solution was then mixed with 50 g. of T–61 tabula alumina having a particle size of $-325$ mesh. The mixture was then poured into a container and the water was allowed to evaporate. At this point, each mixture gave a hard compact disc containing the percent by weight siloxane shown in the table below. Each disc was heated to 1100° C. over a period of 5 hours and then heated 3 hours at 1100° C. In each case, a hard, strong, ceramic-like article was obtained.

Table

| Compound | Wt. of Compound, g. | Composition of dried disc | |
|---|---|---|---|
| | | Percent by wt. siloxane | Percent by wt. alumina |
| $MeCOO(CH_2)_3Si(OMe)_3$ | 1.08 | 1.47 | 98.53 |
| $(C_3H_7Si)(OMe)_3$ | .738 | .85 | 99.15 |
| $Me_2N(CH_2)_3Si(OMe)_2$ Me | .86 | 1.48 | 98.52 |
| $H_2N(CH_2)_2NH(CH_2)_3SiOMe$ Me | 1.18 | .99 | 99.01 |
| $(MeNHCH_2CHCH_2SiO)_x$ Me Me | .65 | 1.28 | 98.72 |

EXAMPLE 11

Equivalent results are obtained when a mixture of 5% by weight $H_2N(CH_2CH_2NH)_2CH_2CH_2CH_2SiO_{1.5}$ and 95% alumina is employed in the procedure of Example 10.

EXAMPLE 12

A hard, ceramic-like article is obtained when a mixture of 5% by weight $C_{18}H_{37}SiO_{1.5}$ and 95% by weight silicon carbide is molded at 10 tons gauge and then fired on the schedule of Example 8.

EXAMPLE 13

17% by weight of a phenylmethylsiloxane resin having an average of 1.15 total methyl and phenyl groups per silicon and having a phenyl to methyl ratio of 1.13 to 1 was mixed with 82% by weight of $-325$ mesh alumina, 1% Ca stearate and .28% PbO. The mixture was molded at 177° C. under a pressure of 3000 p.s.i. for 7 minutes. The resulting molded article was then heated from 177 to 260° C. for 2 hours as the temperature was increased in 10° C. increments; from 260° C. to 650° C. by increasing the temperature 10° C. per hour and finally heated at 980° C. for 3 hours. The properties of the resulting article were 5950 p.s.i. flexural strength, 15,400 p.s.i. compressive strength and .5 foot pound impact strength.

EXAMPLE 14

Hard, ceramic-like articles are obtained when the following siloxanes are mixed with powdered amorphous $SiO_2$ in the proportions shown below and the resulting mixture is heated 5 hours at 850° C.

| Siloxane | Percent by wt. siloxane based on wt. of SiO₂ |
|---|---|
| Me<br>OSiCH₂SiO₁.₅ | 5 |
| Ph<br>OSi⟨C₆H₄⟩SiO₁.₅ | 6 |
| Ph  SiO₁.₅<br>OSiCH₂CHCH₂SiO₁.₅<br>      Me | 10 |
| Me                    Me<br>OSiCH₂CH₂O CH₂CH₂O CH₂CH₂SiO | 10 |
| MeMe<br>(OSi SiO)ₓ | 5 |

That which is claimed is:

1. A method which comprises heating a mixture of from .1 to 30% by weight of an organosiloxane having per silicon atom a total of from 1 to 3 inclusive substituents selected from the group consisting of hydrogen atoms and organic radicals which are attached to the silicon through silicon-carbon linkages which organic radicals are composed of carbon and hydrogen atoms, any remaining atoms in said radicals being selected from the group consisting of oxygen and nitrogen atoms, there being no more than 18 atoms exclusive of hydrogen per organic radical and from 70 to 99.9% by weight of a ceramic material having a softening point above 800° C., said ceramic material being essentially free of materials which volatilize below 800° C., at a temperature from above 500° C. to 1550° C. until a ceramic article is obtained.

2. The method comprising heating an article consisting essentially of a coherent mass of from .1 to 30% by weight of an organosiloxane having per silicon atom a total of from 1 to 3 inclusive substituents selected from the group consisting of hydrogen atoms and organic radicals which are attached to the silicon through silicon-carbon linkages which organic radicals are composed of carbon and hydrogen atoms, any remaining atoms in said radicals being selected from the group consisting of oxygen and nitrogen atoms, there being no more than 18 atoms exclusive of hydrogen per said organic radical and from 70 to 99.9% by weight of a ceramic material having a softening point above 800° C., said ceramic material being essentially free of materials which volatilize below 800° C., at a temperature from above 500° C. to 1550° C. until a ceramic article is obtained.

3. The method comprising molding a mixture of from .1 to 30% by weight of an organosiloxane having per silicon atom a total of from 1 to 3 inclusive substituents selected from the group consisting of hydrogen atoms and organic radicals which are attached to the silicon through silicon-carbon linkage which organic radicals are composed of carbon and hydrogen atoms, any remaining atoms in said organic radical being selected from the group consisting of oxygen and nitrogen atoms, there being no more than 18 atoms exclusive of hydrogen per organic radical and there being on the average at least one of said organic radicals per silicon and from 70 to 99.9% by weight of a ceramic material having a softening point above 800° C., said ceramic material being essentially free of materials which volatilize below 800° C., under heat and pressure to form a coherent mass and thereafter heating the molded article from above 500° C. to 1550° C. until a ceramic article is obtained.

4. A method which comprises heating a mixture of from 3 to 30% by weight of an organopolysiloxane having a total of from 1 to 2 substituents selected from the group consisting of monovalent hydrocarbon radicals of less than 7 carbon atoms and hydrogen atoms, per silicon atom, there being at least an average of one hydrocarbon radical per silicon, and from 70 to 97% by weight of a ceramic material having a softening point above 800° C., said ceramic material being essentially free of materials which volatilize below 800° C., at a temperature from above 500° C. to 1550° C. until a ceramic article is obtained.

5. The method comprising heating an article consisting essentially of a coherent mass of from 3 to 30% by weight of an organopolysiloxane having a total of from 1 to 2 substituents selected from the group consisting of monovalent hydrocarbon radicals of less than 7 carbon atoms and hydrogen atoms, per silicon atom, there being at least an average of one hydrocarbon radical per silicon, and from 70 to 97% by weight of a ceramic material having a softening temperature above 800° C., said ceramic material being essentially free of materials which volatilize below 800° C., at a temperature from above 500° C. to 1550° C. until a ceramic article is obtained.

6. The method comprising molding a mixture of from 3 to 30% by weight of an organopolysiloxane having a total of from 1 to 2 substituents selected from the group consisting of monovalent hydrocarbon radicals of less than 7 carbon atoms and hydrogen atoms, per silicon atom, there being at least an average of one hydrocarbon radical per silicon and from 70 to 97% by weight of a ceramic material having a softening point above 800° C., said ceramic material being essentially free of materials which volatilize below 800° C., under heat and pressure to form a coherent mass and thereafter heating the molded article from above 500° C. to 1550° C. until a ceramic article is obtained.

References Cited in the file of this patent

UNITED STATES PATENTS

| 2,641,044 | Bearer | June 9, 1953 |
| 2,784,105 | Stedman et al. | Mar. 5, 1957 |